May 6, 1941.       A. L. WEINTRAUB ET AL       2,240,919
SPEED LIMITING MEANS
Filed April 4, 1940
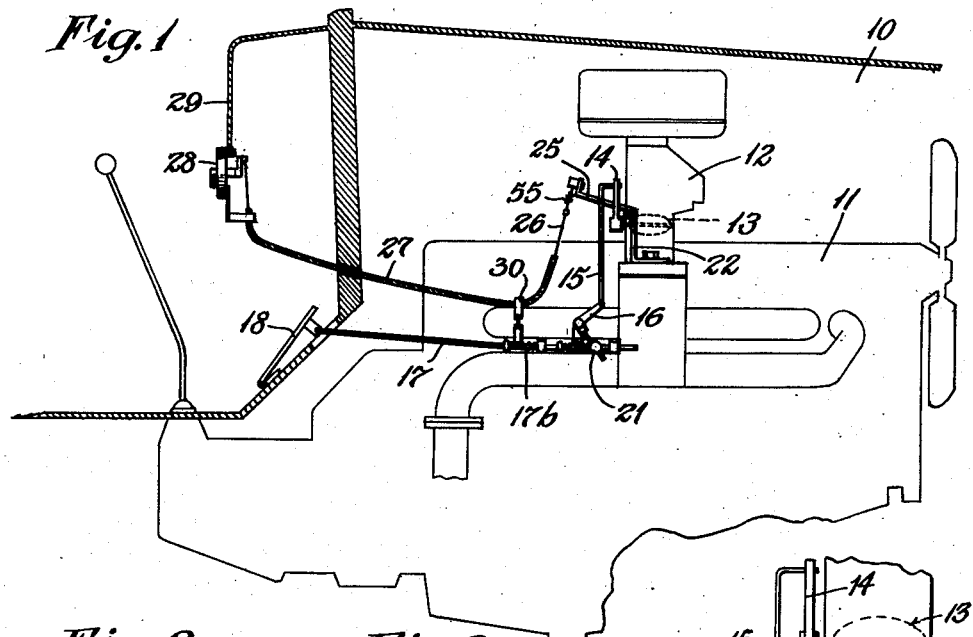
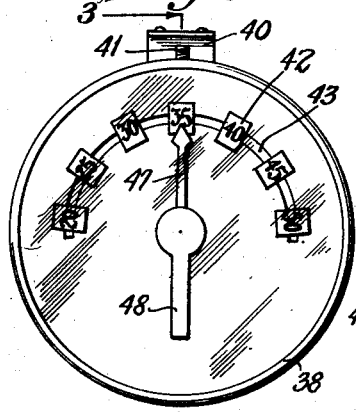
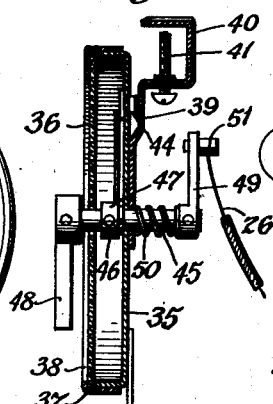
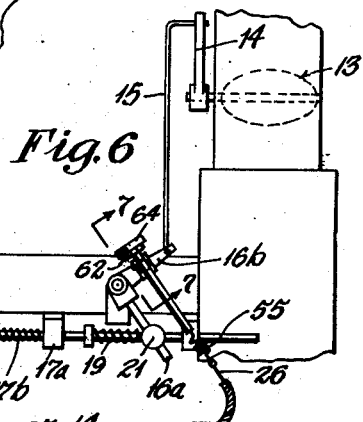
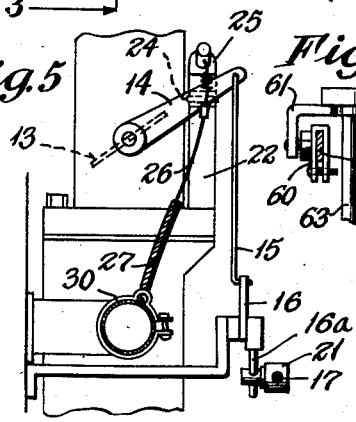
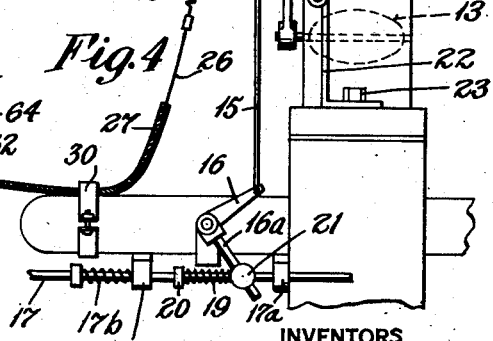
INVENTORS
Andrew L. Weintraub
John Bordash
BY
ATTORNEYS Patented May 6, 1941

2,240,919

UNITED STATES PATENT OFFICE 2,240,919

SPEED LIMITING MEANS

Andrew L. Weintraub and John Bordash, Bridgeport, Conn.

Application April 4, 1940, Serial No. 327,818

11 Claims. (Cl. 74—526)

The present invention relates to means for controlling a motor, and, more particularly, to a device for controlling the amount of fuel supplied to the motor of a motor-propelled vehicle.

Many communities have become conscious of the mounting death rate due to accidents involving speeding automobiles, and have instituted a rigid speed enforcement program.

It is a well-known fact that many drivers, when starting out, will maintain the speed of their automobile within the limits prescribed by the community. However, after driving for a short while and becoming accustomed to this speed, they unconsciously increase this speed to values in excess to the limits prescribed and are innocently guilty of violating the law.

Control means have been proposed for limiting the maximum speed of an automobile, but these have been impractical in that they were either too expensive to manufacture and install, or that they were difficult to adjust for different speeds which a community may permit. For example, some communities have a requirement of fifteen to twenty-five miles per hour in the business sections, and twenty-five to thirty-five miles per hour in outlying sections. With prior constructions, it was difficult to regulate the device for permitted changes in speed so as to remain within the limits during the use of the car in these zones.

It is an object of the present invention to provide a control means which can be cheaply manufactured and readily installed on existing motor vehicles without substantial modification to the equipment of the car, which control means will be easily adjustable for various speed, and when once adjusted will maintain its adjustment throughout use until again manually adjusted.

This is accomplished, according to the present invention, by providing an adjustable stop means to cooperate with the throttle valve of the automobile and limit its movement in supplying fuel to the motor.

A feature of this invention is the novel means for controlling the stop means whereby it can be readily adjusted for each automobile to which it is installed. This control means comprises a unit mounted to the dashboard or other convenient support and having a plurality of units having suitable indicia thereon adustably mounted therein so as to be set when the device is installed on each individual car to a position corresponding to the speed indicated by the indicia. A pointer is secured to a shaft rotatably mounted in the casing so as to cooperate with the indicia and means is associated with the pointer for adjusting the stop cooperating with the throttle arm in accordance with the various speeds to which the pointer is set.

In one form of the invention, the stop comprises a lever pivotally mounted to a bracket and extending over the throttle arm and having its position determined in accordance with the speed selected at the indicator by means of a flexible connector.

In another form of the invention, the adjustable stop is carried by a bracket adapted to be clamped to the throttle arm or an associated member to operate directly thereon for limiting the movement thereof.

A feature of the invention resides in the inclusion in the means for positioning the stop member of a relatively heavy spring which will normally prevent the stop from being moved by the throttle valve beyond the prescribed position, but which will yield in cases of emergency to permit the throttle valve to be operated to supply fuel to drive the motor at higher speeds.

As soon as the emergency is passed, the spring will return the stop member to its original position without requiring the operator to manually reset the stop.

Other features and advantages will hereinafter be apparent from the specification and claims, when taken in connection with the drawing, in which:

Figure 1 shows a side elevational view of one form of the invention mounted on an automobile motor.

Fig. 2 shows a front view of the dial.

Fig. 3 is a longitudinal sectional view, taken along line 3—3 of Fig. 2.

Fig. 4 is a detail elevational view of the form of the invention shown in Fig. 1.

Fig. 5 is an end view, looking from the left of Fig. 4.

Fig. 6 shows a detailed view of another form of the invention.

Fig. 7 is a longitudinal sectional view, taken along the line 7—7 of Fig. 6.

As diagrammatically shown in the drawing, the motor compartment 10 of an automobile has mounted therein a motor 11 having a carburetor 12. The carburetor is provided with a throttle valve 13 having an operating arm or actuator 14 secured thereto and connected by means of a link 15 to a bell crank lever 16 pivotally mounted on a bracket carried by the intake manifold or some other part of the motor.

The bell crank is operated by means of a push rod 17 connected to an accelerator pedal 18. The push rod is normally urged to retracted position by means of a spring 17b operating against a shoulder on the rod and bearing against one of the brackets 17a in which the rod 17 is slidably mounted.

The construction thus far described is standard automotive equipment.

According to the present invention, the bell crank lever is driven through a spring 19, having one end bearing against an abutment 20 on the rod 17, and its other end engaging a crosshead 21 mounted for sliding movement on rod 17 and slidably connected to the arm 16a of the bell crank.

It will thus be seen that the operation of the rod 17 will normally cause the bell crank 16 to rock about its pivot and move the throttle valve through the medium of the link 15. However, the spring 19 will yield to prevent further movement of the bell crank if the throttle valve is limited as will be explained.

In order to limit the movement of the throttle valve, the present invention, in the form shown in Figs. 1 to 5, provides an L-shaped bracket 22 having the base thereof clamped in position by the bolt 23 which normally secures the carburetor in position.

The upper end of the L-shaped arm is provided with a pivot pin 24 upon which is mounted a stop arm 25 so that it projects across and intercepts the path of movement of the throttle valve actuator 14.

The stop arm 25 has its free end connected, by means of a Bowden wire 26 or other suitable flexible connector passing through a cable 27, to the adjusting means 28 mounted in the illustrated form of the invention on a dashboard 29, so that, by properly adjusting the control at the dashboard, the stop arm can be located at various positions with regard to the actuating arm and act directly thereon to control the operation of the throttle valve. The cable or flexible connector is anchored adjacent the carburetor by means of a clamp 30.

The controller of the present invention which is mounted on the dashboard comprises a casing 35 having a transparent cover 36 secured thereto by means of a sleeve 37 slipped over the sides of the casing and having a clamping flange 38 for clamping the transparent cover 36 against the end of the casing.

A bracket 39 is secured to the back of the casing and is provided with a U-shaped attaching clamp 40 having a screw 41 threaded therein for engaging and clamping the dashboard of the automobile.

It will be readily seen that the attaching means enables the control unit to be quickly and easily mounted in the machine.

Within the casing is disposed a plurality of adjustable units 42 having suitable indicia thereon. These indicia may be mounted in many ways. In the illustrated form of the invention, this is accomplished by providing the casing with an arcuate slot 43 formed in the back wall thereof. The units are inserted in the slot and provided with means 44 for engaging the back wall of the casing to hold the units in desired relation in the slot.

The units, according to the preferred form of the invention, are made from spring steel and have a sufficient tension that, when once positioned in the slot, they will be frictionally held in place by the tension of the material. With units so constructed, they can be readily adjusted when the device is installed to the proper positions in the casing to indicate the various speeds to which it may be desired to set the device, and they will be retained against further movement. Also, if the motor wears, the units can be further adjusted to again establish the proper speed indications.

In the broad aspect of the invention, the units may also be made of rubber, or other similar resilient material, which is capable of frictionally gripping the slots and can be thus readily adjusted and will remain at their adjusted position. The indicia may be made of luminous material, or the casing may be provided with suitable illuminating means, if desired.

As shown in Fig. 3, a shaft 45 is mounted in the center of the casing and has an abutment 46 engaging the inner surfaces of the casing and spacing an indicator 47 from the back wall of the casing so that it will properly cooperate with the indicia.

The forward end of the shaft projects beyond the transparent closure member and has mounted thereon a hand knob or operator 48, whereby the shaft can be readily rotated to cause the indicating member to point to one of the indicia carried by the back of the casing.

The other end of the shaft projects beyond the rear end of the casing and has mounted at its rear end an arm 49. A spring 50 surrounds the shaft and has one end abutting against the casing and the other against the arm 49 so as to normally hold the abutment 46 against the back of the casing with sufficient force to hold the shaft in adjusted position.

The end of the arm 49 is provided with an anchoring means 51 to which the flexible means 26 is secured. By rotating the shaft, the flexible connector will be shifted longitudinally and cause the position of the stop arm 25 to be changed. It will be seen that the stop arm will be held in a desired position and form an abutment operating directly on the throttle arm to control its position.

As soon as the accelerator has been depressed sufficiently to cause the bell crank 16 to be operated through the spring 19 to move the throttle arm 14 into engagement with the stop 25, continued movement of the accelerator will merely compress the spring 19 so that further operation of the throttle valve is substantially prevented.

It will be seen thus that the motor will be controlled at the speed set by the operator, and under normal driving conditions will not exceed that speed.

It will be appreciated that at times it may become necessary to increase the speed of the vehicle above that set by the adjusting means. Accordingly, the present invention has provided a relatively strong spring 55, between the arm 25 and the end of the flexible means 26. Should an emergency arise, the operator, by applying additional pressure to the accelerator pedal, can cause the actuating arm 14 to raise the stop arm 25 against the action of this spring 55 so that the throttle valve will supply the additional fuel necessary to speed up the motor. However, as soon as the emergency has passed and the additional pressure on the accelerator removed, the stop arm will return to its original position and will maintain the vehicle at its normal speed.

It is recognized that at times, such as when it is attempted to negotiate a steep grade, the throttle setting will not be sufficient. In this case it is but a simple matter to throw the hand controller and increase the permissive throttle opening so as to provide sufficient fuel to supply the increased power demand.

In some instances, it is not desirable or feasible to utilize a bracket and stop arm, as in the first form of the invention. In this case, the present invention provides means for mounting the stop member directly to the throttle arm or to the bell crank. In the illustrated form of the invention, it is mounted on the bell crank lever, but it is to be understood that it can be just as readily attached to the throttle lever 14 and control its operation.

In this form of the invention, a bracket 60 is clamped to the bell crank lever or throttle arm 16b and is provided with an arm or lever 61 pivotally carried thereby and having an opening 62 therein in which is slidably mounted the stop member 63. The stop member is provided with an enlarged head 64 adapted to abut against the arm 61.

The end of the stop member is connected to the wire 26 through a spring 55, as in the aforementioned form of the invention. It will be apparent that this form of the invention can be easily applied to an existing vehicle by merely clamping the bracket 60 to the bell crank or throttle arm.

The wire 26 is adjusted from the dashboard, as has been previously described, and causes the head 64 of the stop to be positioned in a predetermined relation with the arm on which the stop is mounted.

As the accelerator pedal is pressed down, it will cause the bell crank to pivot and move outwardly toward the head. As soon as the head of the stop engages the arm 61, further movement of the bell crank will be prevented and the additional movement of the accelerator rod will merely compress the spring 19.

Should an emergency exist, additional pressure on the accelerator pedal will cause the stop to be moved by the arm and stretch the spring 55 to permit additional fuel to be supplied to the motor. However, as the emergency is over, the spring 55 will return the stop member to its normal position and again control the motor in accordance with its original setting.

From the foregoing, it will be clear that we have provided an effective and efficient control means, which will be inexpensive and can be easily installed on existing vehicles without substantially modifying the mechanism thereof.

Variations and modifications may be made within the scope of this invention and portions of the improvements may be used without others.

We claim:

1. In combination with a throttle valve for a motor, of means for limiting the operation of said valve including an adjustable stop member, a flexible connector having one end connected to the stop member, and an adjusting means remote from said stop and connected to the other end of the flexible member for moving and positioning the stop to control the extent of movement of the throttle valve to limit the amount of fuel fed to the motor; and means for operating the throttle valve including a yieldable actuator whereby said means becomes normally ineffective to move the valve after the valve has been arrested by the stop member.

2. In combination with a throttle valve for a motor having an actuating arm therefor, of means for limiting the operation of the valve including a bracket mounted on the motor and having a stop arm pivoted thereto to extend into the path of movement of the actuating arm for the valve, a flexible connector having one end connected to the stop arm, and an adjusting means remote from said stop arm and connected to the other end of the flexible member for moving the arm to vary the position in which it engages the actuating arm to control the extent of movement of the throttle valve and limit the amount of fuel fed to the motor; and means for operating the actuating arm for the throttle valve including a yieldable means whereby said operating means becomes normally ineffective to move the valve after the actuating arm has been engaged by the stop arm.

3. In combination with a throttle valve for a motor having an actuating arm therefor, of means for limiting the operation of the valve including a bracket mounted on the motor and having a stop arm pivoted thereto to extend into the path of movement of the actuating arm for the valve; positioning means for the stop arm comprising a flexible connector having one end connected to the arm and the other end connected to an adjustable regulator remotely positioned from said stop arm whereby adjustments of the regulator will cause the stop arm to be moved about the pivotal mounting therefor and vary the point of engagement between the stop arm and actuating arm to control the amount of fuel fed to the motor; and means movable upon application of normal pressure thereto for operating the actuating arm for the throttle valve, said means including a yieldable driver whereby the said operating means becomes ineffective to move the valve under said normal pressure after the actuating arm has engaged the stop arm.

4. In combination with a throttle valve for a motor having an actuating arm therefor, of means for limiting the operation of the valve including a bracket mounted on the motor and having a stop arm pivoted thereto to extend into the path of movement of the actuating arm for the valve, positioning means for the stop arm comprising a yieldable member and a flexible connector having one end connected to the arm and the other end connected to an adjustable regulator remotely positioned from said stop arm whereby adjustments of the regulator will cause the stop arm to be moved about the pivotal mounting therefor and vary the point of engagement between the stop arm and actuating arm to control the amount of fuel fed to the motor; and means movable upon application of normal pressure thereto for operating the actuating arm for the throttle valve, said means including a yieldable driver whereby the said operating means becomes ineffective to move the valve under said normal pressure after the actuating arm has engaged the stop arm, said yieldable member yielding under an abnormal pressure on the operating means whereby the stop arm is moved by the actuating arm and the throttle valve supplies additional fuel to the motor and returning the stop arm to adjusted position upon release of the abnormal pressure.

5. An attachment for use with a throttle valve of a motor having an actuating arm directly connected thereto, stop means for directly engaging the actuating arm to limit the movement thereof; and means remote from the valve and including a flexible connector having one end yieldably connected to the stop means for moving said stop means and varying the position in which the stop means engages the actuating arm and controls the amount of fuel fed to the motor.

6. An attachment for use with a throttle valve for a motor having an actuator connected thereto, comprising means for limiting the operation of the valve including a bracket clamped to the actuator, a stop member slidably mounted on said bracket and having an abutment to engage and limit movement of the actuator, a flexible connector having one end connected to the stop member, and an adjusting means remote from said stop member and connected to the other end of the flexible member for positioning the abutment of the stop member with respect to the bracket so as to vary its engagement with said actuator to control the extent of movement of the throttle valve to limit the amount of fuel fed to the motor; and means for operating the throttle valve actuator including a yieldable driving means whereby said operating means becomes normally ineffective to move the valve after the actuator has been engaged by the abutment.

7. In combination with a throttle valve for a motor having an actuator connected thereto, of means for limiting the operation of the valve including a bracket clamped to the actuator, an arm pivoted to said bracket and a stop member slidably mounted in said arm and having an abutment to engage said arm to limit movement of the actuator, a flexible connector having one end connected to the stop member, an adjusting means remote from said stop member and connected to the other end of the flexible member for positioning the abutment of the stop member to vary its engagement with said actuator to control the extent of movement of the throttle valve to limit the amount of fuel fed to the motor; and means for operating the throttle valve actuator including a yieldable driving means whereby said operating means becomes normally ineffective to move the valve after the actuator has been engaged by the abutment.

8. In combination with a throttle valve for a motor having an actuator connected thereto, of means for limiting the operation of the valve including a bracket clamped to the actuator, an arm pivoted to said bracket and a stop member slidably mounted in said arm and having an abutment to engage said arm to limit movement of the actuator, positioning means for the stop member comprising a flexible connector having one end connected to the stop member and the other end connected to an adjustable regulator remotely positioned from said stop member whereby adjustments of the regulator will cause the stop member to be shifted in the pivoted arm and vary the point of engagement between the abutment and actuator to control the amount of fuel fed to the motor; and means movable upon application of normal pressure thereto for operating the actuator for the throttle valve, said means including a yieldable driver whereby the said operating means becomes ineffective to move the valve under said normal pressure after the abutment has engaged the pivoted arm carried by the actuator.

9. In combination with a throttle valve for a motor having an actuator connected thereto, of means for limiting the operation of the valve including a bracket clamped to the actuator, an arm pivoted to said bracket and a stop member slidably mounted in said arm and having an abutment to engage said arm to limit movement of the actuator, positioning means for the stop member comprising a yieldable member and a flexible connector having one end connected to the stop member and the other end connected to an adjustable regulator remotely positioned from said stop member whereby adjustments of the regulator will cause the stop member to be shifted in the pivoted arm and vary the point of engagement between the abutment and arm to control the amount of fuel fed to the motor; and means movable upon application of normal pressure thereto for operating the actuator for the throttle valve, said means including a yieldable driver whereby the said operating means becomes ineffective to move the valve under said normal pressure after the arm has engaged the abutment, said yieldable member yielding under an abnormal pressure on the operating means whereby the abutment is moved by the actuator and the throttle valve supplies additional fuel to the motor and returning the abutment to adjusted position upon release of the abnormal pressure.

10. In combination with a throttle valve for a motor, of means for limiting the operation thereof including a stop member, a flexible connector having one end connected to the stop member, an adjusting means remote from said stop comprising a casing having a rotatable shaft mounted therein provided with an arm secured thereto, and means at the end of said arm connected to the other end of the flexible member to cause longitudinal movement thereof upon rotation of the shaft for positioning the stop to control the extent of movement of the throttle valve to limit the amount of fuel fed to the motor; and means for operating the throttle valve including a yieldable actuator whereby said means becomes normally ineffective to move the valve after the valve has been arrested by the stop member.

11. In combination with a throttle valve for a motor, of means for limiting the operation thereof including a stop member, a flexible connector having one end connected to the stop member, an adjusting means remote from said stop comprising a casing having a rotatable shaft mounted therein provided with an arm secured thereto, indicia adjustably mounted in the casing, an indicator secured to the shaft, and means at the end of said arm connected to the other end of the flexible member to cause longitudinal movement thereof upon rotation of the shaft to set the indicator with respect to the indicia for positioning the stop to control the extent of movement of the throttle valve in accordance with such setting to predeterminedly limit the amount of fuel fed to the motor; and means for operating the throttle valve including a yieldable actuator whereby said means becomes normally ineffective to move the valve after the valve has been arrested by the stop member.

ANDREW L. WEINTRAUB.
JOHN BORDASH.